(12) United States Patent
Hsu

(10) Patent No.: US 7,209,587 B1
(45) Date of Patent: Apr. 24, 2007

(54) AMORPHOUS REGION AND BOUNDARY/CHAIN TOPOLOGY FOR AN OBJECT RECOGNITION SYSTEM

(76) Inventor: Shin-yi Hsu, 2312 Hemlock La., Vestal, NY (US) 13850

( * ) Notice: Subject to any disclaimer, the term of this patent is extended or adjusted under 35 U.S.C. 154(b) by 0 days.

(21) Appl. No.: 09/532,175

(22) Filed: Mar. 21, 2000

(51) Int. Cl.
*G06K 9/34* (2006.01)

(52) U.S. Cl. .................. 382/173; 382/305; 706/48

(58) Field of Classification Search ........ 382/103–107, 382/190–205, 173–180, 209, 309, 155–159, 382/131, 113, 162–166, 224–225, 181, 115–119, 382/305; 707/1–6, 104.1; 706/55–59, 45–48; 716/3

See application file for complete search history.

(56) References Cited

U.S. PATENT DOCUMENTS

| | | | | | |
|---|---|---|---|---|---|
| 5,033,101 | A | * | 7/1991 | Sood | 382/209 |
| 5,867,596 | A | * | 2/1999 | Kano et al. | 382/203 |
| 6,064,806 | A | * | 5/2000 | Lakos et al. | 716/3 |
| 6,151,424 | A | * | 11/2000 | Hsu | 382/294 |
| 6,385,350 | B1 | * | 5/2002 | Nicholson et al. | 382/309 |
| 6,404,920 | B1 | * | 6/2002 | Hsu | 382/190 |
| 6,424,732 | B1 | * | 7/2002 | Shiffman et al. | 382/131 |
| 6,804,394 | B1 | * | 10/2004 | Hsu | 382/173 |

OTHER PUBLICATIONS

Weng et al. "Learning recognition and Segmentation of 3-D objects from 2-D images" Proc, Computer Vision IEEE May 1993.*
Ordonez et al. "Discovering association rules based on image content" Proc. IEEE Forum on Research and Technology Advances in Digital Library 1999, May 1999, pp. 38-49.*
Caelli et al. "Scene understanding by rule evaluation" IEEE Trasaction on Patter Analysis and Machine Intelligence, vol. 19 issu 11, pp. 1284-1288, Nov. 1997.*
Weng et al. "Learning recognition and segmentation of 3-D object form 2-D images", Proc. Fourth inteenational conf. on Computer vision, 1993, pp. 121-128, May 1993.*
Hermes et al., Image Retrieval for Information Systems, SPIE Vo. 2420, pp. 394-404.*
Soffer et al., Retrieval by content in symbolic image database, SPIE 2670, pp. 144-155.*

* cited by examiner

*Primary Examiner*—Ishrat Sherali
(74) *Attorney, Agent, or Firm*—Mark Levy & Associates, PLLC; David L. Banner

(57) ABSTRACT

The present invention features a method for identifying objects in an image and automatically generating of object recognition code. First, an image is segmented and coded in a first plane in at least one segmentation domain to create a first set of uniform fields or regions having interior and exterior information. Then the image is segmented and coded in a second plane, again in at least one segmentation domain, to create a second set of uniform fields or regions having interior and exterior information. The relationship of the boundaries of the first and second sets of fields is then determined. Information representative of the uniform fields is analyzed and/or communicated horizontally and vertically for relationships of objects among the planes. The system is then queried, forming object definitions, in order to recognize objects in the image. The objects can also be displayed on a common image domain. The image can also be resegmented, each field being coded by a multi-bit (e.g., 32 bit) representation of an identification code. Boundaries and chains can be generated from the image. The objects in the image can also be arranged by order of importance.

10 Claims, 13 Drawing Sheets
(5 of 13 Drawing Sheet(s) Filed in Color)

disjoint(p,q)

meet(p,q)

overlap(p,q)

covered by(p,q)
covers(q,p)

inside(p,q)
contains(q,p)

equal(p,q)

| | Size | Tone | Row Cent | Column C | Row Min | Row Max | Column M | Column M | Convolutic | Elongatior | Constrictic | Linearity | Aspect |
|---|---|---|---|---|---|---|---|---|---|---|---|---|---|
| 1 | 210135 | 71 | 221.4 | 241.7 | 0 | 459 | 0 | 479 | 9258 | 0 | 10000 | 107 | 9866 |
| 2 | 178 | 42 | 170.2 | 25.6 | 166 | 175 | 0 | 54 | 10000 | 10000 | 10000 | 9008 | 6361 |
| 3 | 9 | 37 | 169 | 74 | 169 | 169 | 70 | 78 | 0 | 0 | 0 | 10000 | 0 |
| 4 | 1172 | 43 | 180.5 | 285.4 | 172 | 195 | 88 | 479 | 10000 | 10000 | 10000 | 9935 | 4036 |
| 5 | 1 | 23 | 174 | 472 | 174 | 174 | 472 | 472 | 0 | 0 | 0 | 0 | 0 |
| 6 | 5 | 28 | 176.2 | 470.6 | 175 | 177 | 470 | 471 | 0 | 0 | 0 | 1624 | 10847 |
| 7 | 1 | 89 | 232 | 316 | 232 | 232 | 316 | 316 | 0 | 0 | 0 | 0 | 0 |
| 8 | 19 | 118 | 242.3 | 478.5 | 236 | 247 | 478 | 479 | 268 | 5798 | 1032 | 8052 | 13412 |
| 9 | 648 | 156 | 272.4 | 275.9 | 236 | 281 | 245 | 302 | 3855 | 7241 | 1032 | 6552 | 7493 |
| 10 | 15 | 94 | 260.1 | 250.5 | 263 | 281 | 247 | 254 | 1615 | 3297 | 3926 | 6341 | 7508 |
| 11 | 1 | 89 | 279 | 255 | 279 | 279 | 255 | 255 | 0 | 0 | 0 | 0 | 0 |
| 12 | 1 | 157 | 297 | 103 | 297 | 297 | 103 | 103 | 0 | 0 | 0 | 0 | 0 |
| 13 | 4 | 162 | 297.5 | 251.5 | 297 | 298 | 251 | 252 | 0 | 0 | 0 | 7478 | 10000 |
| 14 | 66 | 148 | 304.6 | 240.5 | 298 | 309 | 226 | 257 | 10000 | 10000 | 10000 | 0 | 7257 |
| 15 | 1 | 143 | 303 | 262 | 303 | 303 | 262 | 262 | 0 | 0 | 0 | 0 | 0 |
| 16 | 57 | 201 | 305.3 | 112.2 | 305 | 308 | 86 | 132 | 10000 | 10000 | 10000 | 9867 | 4012 |
| 17 | 22 | 168 | 306.5 | 5 | 306 | 307 | 0 | 10 | 518 | 6339 | 1617 | 8463 | 6311 |
| 18 | 3 | 143 | 306 | 202 | 306 | 306 | 201 | 203 | 0 | 0 | 0 | 10000 | 0 |
| 19 | 2 | 150 | 306.5 | 225 | 306 | 307 | 225 | 225 | 0 | 0 | 0 | 10000 | 20000 |
| 20 | 1 | 146 | 307 | 222 | 307 | 307 | 222 | 222 | 0 | 0 | 0 | 10000 | 0 |
| 21 | 6 | 202 | 310.5 | 128 | 309 | 312 | 127 | 129 | 0 | 0 | 0 | 6104 | 10318 |
| 22 | 5 | 186 | 313.8 | 103.8 | 313 | 315 | 103 | 105 | 0 | 0 | 0 | 4753 | 10000 |
| 23 | 1 | 185 | 313 | 126 | 313 | 313 | 126 | 126 | 0 | 0 | 0 | 0 | 0 |
| 24 | 2 | 136 | 313.5 | 166 | 313 | 314 | 166 | 166 | 0 | 0 | 0 | 10000 | 20000 |
| 25 | 1 | 181 | 314 | 125 | 314 | 314 | 125 | 125 | 0 | 0 | 0 | 0 | 0 |
| 26 | 1 | 174 | 314 | 124 | 314 | 314 | 124 | 124 | 0 | 0 | 0 | 0 | 0 |
| 27 | 1 | 135 | 315 | 167 | 315 | 315 | 167 | 167 | 0 | 0 | 0 | 0 | 0 |
| 28 | 120 | 147 | 326 | 396.1 | 321 | 329 | 376 | 407 | 5847 | 10000 | 7149 | 7562 | 7070 |
| 29 | 7 | 129 | 323 | 148.4 | 322 | 324 | 147 | 151 | 0 | 0 | 0 | 4562 | 7938 |
| 30 | 6 | 191 | 323.5 | 314 | 322 | 324 | 313 | 316 | 0 | 0 | 0 | 2928 | 9173 |
| 31 | 5 | 182 | 324.2 | 368.6 | 323 | 325 | 368 | 369 | 4539 | 7058 | 4639 | 1624 | 15847 |
| 32 | 13 | 161 | 326.5 | 427.5 | 323 | 328 | 423 | 430 | 0 | 0 | 0 | 3005 | 9651 |
| 33 | 5 | 148 | 326.8 | 286.8 | 325 | 328 | 286 | 287 | 0 | 0 | 0 | 5967 | 12140 |
| 34 | 2 | 170 | 326 | 418.5 | 326 | 326 | 418 | 419 | 0 | 0 | 0 | 10000 | 0 |
| 35 | 13 | 174 | 329.2 | 418.2 | 327 | 330 | 416 | 422 | 2431 | 1478 | 3926 | 3304 | 8464 |
| 36 | 9 | 111 | 327.3 | 461.7 | 327 | 328 | 458 | 465 | 9588 | 10000 | 0 | 8795 | 6908 |
| 37 | 48 | 146 | 331.4 | 333.3 | 329 | 332 | 321 | 349 | 0 | 0 | 9119 | 9431 | 5330 |
| 38 | 2 | 154 | 329.5 | 345 | 329 | 330 | 345 | 345 | 0 | 0 | 0 | 10000 | 20000 |
| 39 | 1 | 169 | 330 | 320 | 330 | 330 | 320 | 320 | 0 | 0 | 0 | 0 | 0 |
| 40 | 2 | 126 | 330.5 | 358 | 330 | 331 | 358 | 358 | 0 | 0 | 0 | 10000 | 20000 |
| 41 | 5 | 146 | 330 | 448 | 330 | 330 | 446 | 450 | 0 | 0 | 0 | 10000 | 0 |
| 42 | 2 | 167 | 331 | 353.5 | 331 | 331 | 353 | 354 | 0 | 0 | 0 | 10000 | 20000 |
| 43 | 2 | 139 | 331.5 | 476 | 332 | 332 | 476 | 476 | 0 | 0 | 0 | 10000 | 0 |
| 44 | 1 | 127 | 332 | 411 | 332 | 332 | 411 | 411 | 0 | 0 | 0 | 0 | 0 |
| 45 | 96 | 178 | 340.1 | 432.8 | 340 | 341 | 395 | 479 | 10000 | 10000 | 10000 | 9992 | 1299 |

AMORPHOUS REGION AND BOUNDARY/CHAIN TOPOLOGY FOR AN OBJECT RECOGNITION SYSTEM

FIELD OF THE INVENTION

The present invention relates to object recognition systems for images and, more particularly, to a multi-cycle segmentation and multi-image layer system for encoding and recognizing objects.

BACKGROUND OF THE INVENTION

A geographic information system (GIS) that performs computerized analysis of map/image data/information to support decision making processes was developed in the 1960s. A historical treatment of this subject is given by Roger F. Tomlinson entitled, "Geographic Information Systems—A New Frontier," *The Professional Geographer,* 1984, pp. 31–35; reprinted in *Introductory Readings in Geographic Information Systems,* edited by Peuquet and Marble, pp. 18–29. From the beginning, spatial information such as map data was collected from a paradigm deep-rooted in classical geometry that views the world in terms of three shape primitives: 1) point, 2) line, and 3) polygon, and their corresponding topological relationships as shown in FIGS. 1 and 2, extracted from "A Classification of Software Components Commonly Used in Geographic Information Systems", *Design and Implementation of Computer-based Geographic Information System,* edited by Peuquet and O'Collanghan, Amhurst, N.Y. IGU Commission on Geographic Data Sensing and Processing, pp. 70–91.

Point, line and polygon are based on "measured x,y locations" for locational data. A point has one (x,y) data point, and a line has multiple data points in which two points are connected to form a straight line segment. A a polygon is a closed, 2-D shape enclosing a space by a boundary contour which is made of multiple straight line segments.

As shown in FIG. 2, a conventional GIS spatial model, and topological relationships are structured according to these spatial primitives:

1) node is a point that has an (x,y) coordinate;
2) link is a straight line segment that connects two nodes;
3) link has an identification (ID);
4) polygon is composed of multiple closed links;
5) polygon has an ID; and
6) link has a right polygon and a left polygon.

Since this model is inherent in the Environmental Systems Research Institute's (ESRI) ARC/Info, the most popular GIS software, it is clear that a point/line/polygon-based spatial structure is still the dominant GIS paradigm.

In the early 1990s, the term "topological relations" was extended from the aforementioned classic geometry paradigm to a two-object spatial relationships model in the framework of algebraic topology, as evidenced in "A Framework for the Definition of Topological Relationships and an Algebraic Approach to Spatial Reasoning Within This Framework", by Egenhofer, Herring Smith, and Park, Technical Paper 91-7, NCGIA, September 1991. This algebraic topology-based spatial model is similar to the classical point/line/polygon model. For example, in "The 9-Intersection Formalism and Its Use for Natural-Language Spatial Predicates", (Technical Report 94-1, NCGIA, May 1994), Egenhofer and Herring wrote:

"The algebraic-topology spatial data model is based on primitive geometric objects, called cells, which are defined for different spatial dimensions: a 0-cell is a node (the minimal 0-dimensional object); a 1-cell is the link between two distinct 0-cells; and a 2-cell is the area described by closed sequences of three non-intersecting 1-cells. A face of an n-cell A is any (0 . . . n) cell that is contained in A."

From the above basic definition, cells for regions, lines, and points are defined as follows:

A region is a 2-complex in $R^2$ with a non-empty, connected interior.

A line is a sequence of connected 1 complexes in $R^2$ such that they neither cross each other nor form closed loops.

A point is a single 0-cell in $R^2$.

In this point/line/region framework, spatial relationships are developed by intersecting two shape primitives in numerous possible conditions. For example, the authors showed 33 relations between two simple lines as shown in FIG. 3.

"Topological Relations in the World of Minimum Bounding Rectangles: A Study with R-tree", by Papadias, Theodoridis, Sellis and Egenhofer (Technical Report 94-8, NCGIA, December, 1994) illustrated some relationships between two regions as: 1) disjoint (p,q), 2) meet (p,q), 3) overlap (p,q), 4) Covered by (p,q), 5) inside (p,q), and 6) equal (p,q) as shown in FIG. 4.

If the classical geometry-based point/line/polygon structure is denoted as Model #1 spatial topology, and the above-discussed disjoint/meet/overlap/etc configuration as Model #2 spatial topology, Model #1 conceptualizes points, lines and polygons existing on the same plane. Consider a commonly-known house plan as an analogy. Model #1 restricts points, lines, and polygons on the same floor.

Model #2 conceptualizes the existence of objects in terms of a multiple-plane architecture. For example:

Scenario #1: a same plane structure to accommodate:
1) disjoint (p,g), and (2) meet (p,q)
Scenario #2: multiple planes structure to accommodate:
3) overlap (p,g), (4) covered by (p,q), (5) inside (p,q), (6) equal (p,q) and so on.

By using the same house floor structure for illustration, for condition (3):

Object p exists on the first floor of the house, and
Object q exists on the second floor of the same house.

This multi-layer spatial structure is necessary to accommodate the Scenario #2 condition. Basically, in a real world GIS system, it requires that a space or entity on the surface of the Earth is occupied by one object for one particular application or coverage. Otherwise, there exists a topological conflict or there is no topological integrity.

Using this axiom, the classical geometry-based point/line/polygon structure illustrated in FIG. 2, the conditions of disjoint (p,q) and meet (p,q) illustrated in FIG. 4 do not have a topological integrity problem; whereas, overlap (p,q), covered by (p,q), inside (p,q), and equal (p,q) have a topological integrity problem as summarized in Table 1.

TABLE 1

Spatial Relationships in The Context of Topological Integrity

| Model #1 Conditions | Model #2 Conditions |
|---|---|
| (1) Relationships without Topological Problem, But has Limited Capability In Object Recognition point, line. Polygon structure In FIG. 2 Disjoint, meet in FIG. 4 | (2) Relationships with Topological Conflicts, But has Much More Capability in Object Recognition overlap, covered_by, Inside, equal, etc In FIG. 4 |

As noted in Table 1, both Model #1 and Model #2 conditions have certain weaknesses and strengths in handling spatial data/information for constructing a GIS for object recognition.

It would be advantageous to provide an object recognition system to accommodate both Model #1 and Model #2 conditions in such a way that objects can be extracted and recognized in an environment where constraints on topological integrity are not required, and at the same time, the corresponding scene structure/object can be displayed and outputted to an environment with full topological integrity.

It would also be advantageous to provide a data processing environment in which an object can be differentiated by its ID in both segmentation cycle and input layer, thus allowing objects to exist in a non-topology-integrity-compliance environment.

It would also be advantageous to provide a means for objects extracted in a non-topology-integrity-compliant environment to exist in an environment constrained for topological integrity.

In addition, it would be advantageous to provide a means by which objects with full topological integrity can be generated automatically from image data without having to manually digitize and edit the node, the line, the polygon, etc.

Furthermore, it would be advantageous to provide a means to visualize and edit, if necessary, the object and/or its corresponding boundary/chain/node and attribute table.

It would also be advantageous to provide a means to compute and display discrepancies between two sets of boundary contours—an observed and a standard—for change detection and accuracy assessment under a full topological integrity paradigm after they are extracted under a feature/object extraction system in which topological integrity is not an issue.

It would be extremely advantageous to provide a means to recycle again and again a set of extracted objects back into the system in a multi-layer structure to extract additional objects and features for which information processing is done by words and concepts (i.e., multiple facets of the characteristics of an object, the combination of which is difficult to quantify precisely) instead of crisp numerical analysis.

It would be even more advantageous to provide a means to automatically generate a word and concept based rule set that requires the user only to point and click the locations where the target object and its associated features are located (i.e., verbal articulation of how the target object is to be extracted is not required).

SUMMARY OF THE INVENTION

In accordance with the present invention, there is provided a method for identifying objects in an image. Information processing is done by words and concepts instead of crisp numeric analyses, and the rule set is generated automatically after the user points and clicks the locations where the largest target and its associated features are located. First, an image is segmented and coded in a first plane in at least one segmentation domain to create a first set of uniform fields or regions having interior and exterior information. Then the image is segmented and coded in a second plane, again in at least one segmentation domain, to create a second set of uniform fields or regions having interior and exterior information. The relationship of the boundaries of the first and second sets of fields is then determined. Information representative of the uniform fields is analyzed and/or communicated horizontally and vertically for relationships of objects among the planes. The system is then queried, forming object definitions, in order to recognize objects in the image. An object can be used as a means to create an additional layer (and added to the system) to extract additional objects, which can also be recycled into system as additional seeds for object extraction in an iterative fashion. The objects can also be displayed on a common image domain. The image can also be resegmented, each field being coded by a multi-bit (e.g., 32 bit) representation of an identification code. Boundaries and chains can be generated from the image. The objects in the image can also be arranged by order of importance.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A complete understanding of the present invention may be obtained by reference to the accompanying drawings, when considered in conjunction with the subsequent detailed description, in which:

FIG. 11 is a feature attribute table corresponding to the image shown in FIG. 7;

FIG. 12 is a photographic and tabular depiction that shows the accuracy of the inventive system based on matching two sets of boundary contours.

DETAILED DESCRIPTION OF THE PREFERRED EMBODIMENT

Figure 1:
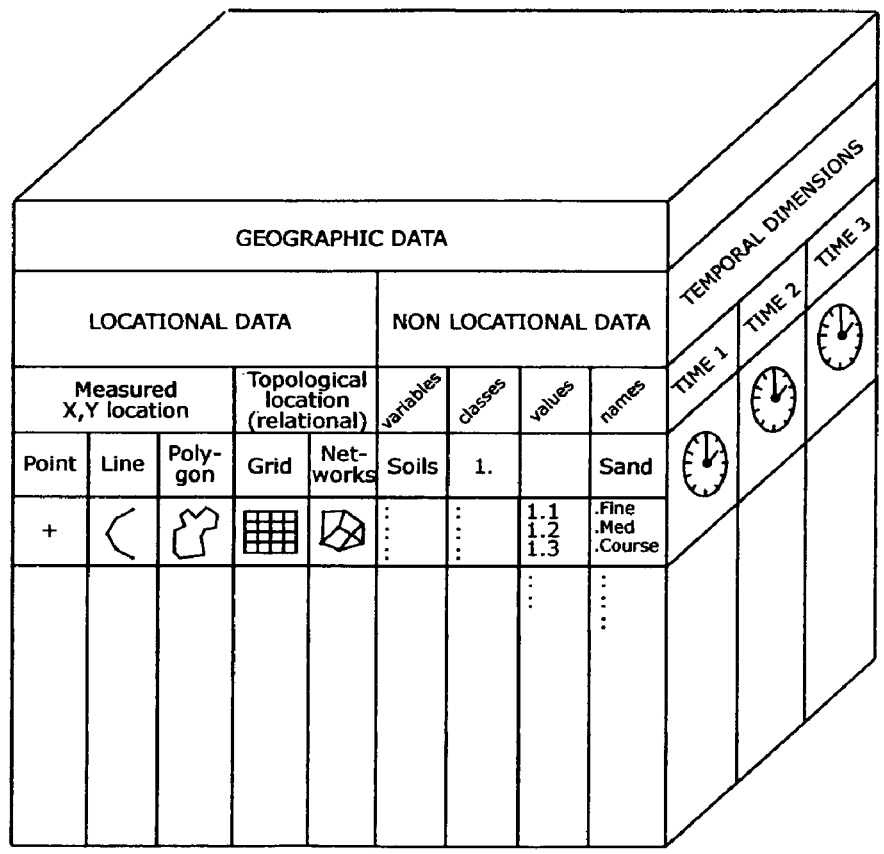
FIG. 1 is a three-dimensional representation of a conventional GIS model, based on classical geometry.

Generally speaking, the invention is a method for identifying objects in an image in the environment in which information processing is done by words and concepts. An image is segmented and coded at least twice, in separate planes in at least one segmentation domain to create sets of uniform fields or regions having interior and exterior information. The relationship of the boundaries of the first and second sets of fields is then determined. Information representative of the uniform fields is analyzed and/or communicated horizontally and vertically for relationships, including characteristics and attributes, of objects among the planes. The system is then queried, forming object definitions, in order to recognize objects in the image. Object definition is in part done by processing by words and concepts. Extracted objects can be used to form other image layers which are then used to extract other objects. Rule sets can be generated automatically once the evaluations of the target object and its associated features are pointed and clicked by the user.

The objects can also be displayed on a common image domain. The image can also be resegmented, each field being coded by a multi-bit (e.g., 32 bit) representation of an identification code. Boundaries and chains can be generated from the image. The objects in the image can also be arranged by order of importance. A new image can be generated based on information provided in the attribute table. Object recognition can be performed with this new "synthetic" image alone or in combination with other images.

To allow objects to co-exist in topological-integrity compliance and a topologically conflicting environments, a novel object recognition and extraction system has been developed for imagery in which a number of components is provided.

A Programming Environment in which Key Words and Syntax are Derived from Plain English As shown in U.S. Pat. Nos. 5,631,970 and and 5,640,468 and co-pending patent applications, Ser. No. 09/191,394, filed Nov. 13, 1998, and Ser. No. 09/058,473, filed Apr. 10, 1998, all of which are hereby incorporated by reference, the IMaG system developed by the present inventor has a unique programming language to extract an object by processing information by words and concepts, resulting in using only a few lines of code. Key words and syntax are derived from plain English. For example, with seven input bands, the corresponding command is:

$$\text{Bands=7;} \quad (1)$$

If the object is to be extracted in terms of a tone range of 0 to 80, a size range of 3000 to 10000, and an elongation range of 9000 to 10000, the syntax is:

$$\text{region dark\_elong:[\#0 tone 1 = (0 80)][\#0 size 1 =} \quad (2)$$
$$(3000\ 10000)][\#0\ \text{elongation 1} = (9000\ 10000)];$$

In the foregoing example, these three attributes (tone, size and elongation) are used to form a concept. If the object is made of bright pixels, and 10 pixels from the object dark_elong (above), the syntax is:

$$\text{pixel bright\_near\_dark\_elong: }[tone\ 1 = \quad (3)$$
$$(180\ 255)][\text{approaches 10 dark\_elong};$$

The two attributes (tone and approaches 10) form another concept.

Using the scenario discussed in FIG. 4 in which object p overlaps object q, the following algorithm simulates this condition as follows:

$$\text{Region object\_p:[\#0 size 1 = (500\ 1000)][\#0 elongation 1 =} \quad (4)$$
$$(8000\ 10000)];$$
$$\text{Region object\_q:[\#0 size 1 = (100\ 500)][\#0 elongation 1 =}$$
$$(0\ 3000)];$$
$$\text{Region object\_pq:[is object\_p][touches object\_q];}$$
$$/\ast \text{spatial analysis here} \ast/$$

The three sets of definitions in Equation (4) form a new concept.

Figure 4:
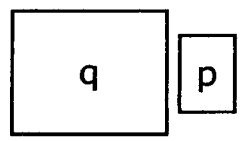
FIG. 4 is a schematic representation of topological relationships between two rectangles.
Figure 4:
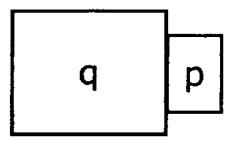
Figure 4:
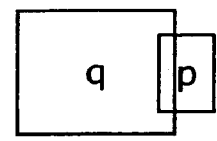
Figure 4:
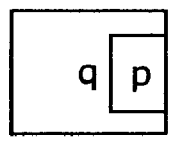
Figure 4:
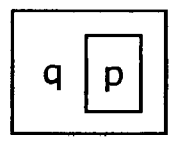
Figure 4:

In Equation (4), the key word "touches" is used to simulate the condition of "overlap" expressed in FIG. 4.

An Object Encoding System

In Equation (4):

0 identified the condition that the object exists in the initial segmentation cycle.

1 identified the condition that the object exists in the first segmentation after the initial segmentation.

"#1 size 1" identified the condition that the object exists by attribute "size" in band 1 in the #1 segmented cycle.

These two object identifiers create a multi-segmentation-cycle and a multi-layer environment for objects with similar attributes and objects having topological conflicts to exist. For example, if objects p and q have almost identical attributes, the rule set of Equation (4) cannot differentiate object_p from object_q. It follows that object_pq does not exist. If object_p is on layer 1, and object_q is on layer 2, object_pq can be extracted as shown in Equation (5).

$$\text{Region object\_p:[\#0 size 1 = (500\ 1000)][\#0 elongation 1 =} \quad (5)$$
$$(8000\ 10000)]; /\ast \text{ layer 1 data } \ast/$$
$$\text{Region object\_q:[\#0 size 2 = (500\ 1000)][\#0 elongation 2 =}$$
$$(8000\ 10000)]; /\ast \text{ layer 2 data } \ast/$$
$$\text{Region object\_pq:[is object\_p][touches object\_q]; }/\ast$$
$$\text{spatial analysis here } \ast/$$

Object Display System to Resolve Topological Conflicts

The term "touches" in Equation (5) can be defined either as "meet", as "overlap", as "covered by, as "inside", or as "equal" condition in FIG. 4, repeated below.

Except for the "meet" condition, the remaining four "touches" conditions result in topological conflicts, because their boundary conditions do not fulfill Model #1 conditions as given in FIG. 2, repeated below.

Figure 2:
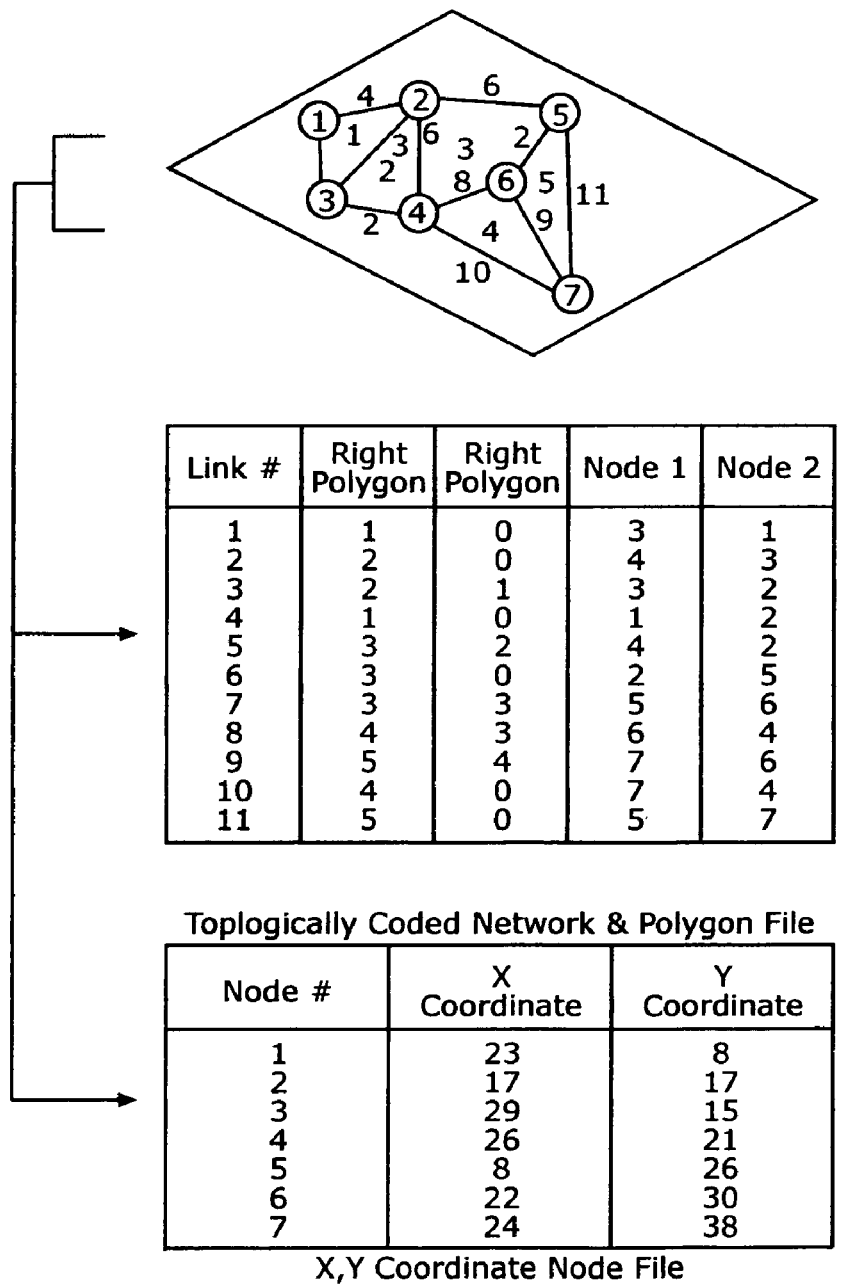
FIG. 2 is schematic and tabular diagram depicting a classical, conventional GIS spatial analysis model.
Figure 3:
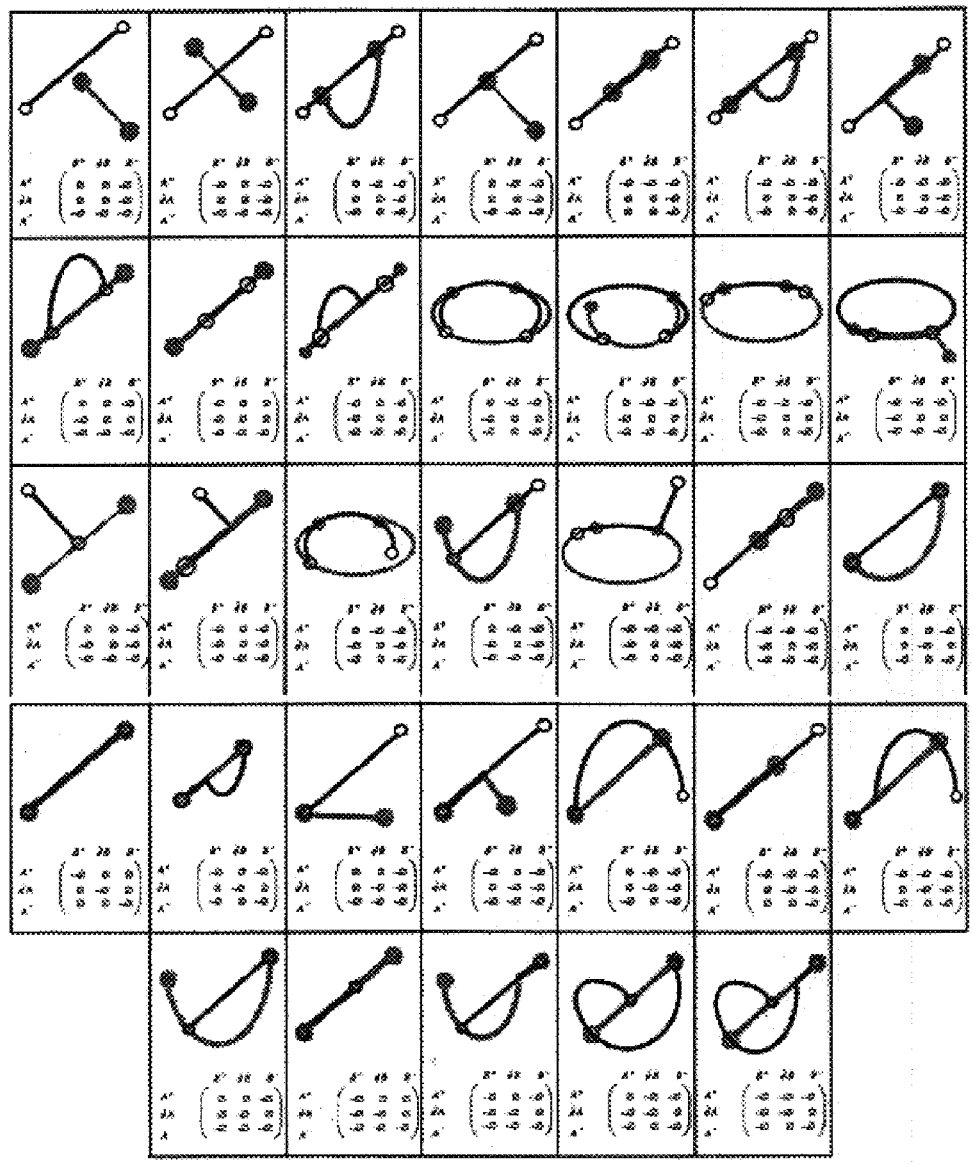
FIG. 3 is a geometric interpretation of thirty-three relations that can be realized between two simple lines.

To solve the topological-conflicting problems, conventional GIS systems edit the links between polygons so that a database conforming to the structure of FIG. 2 can be generated. However, this largely manual editing approach is error-prone, tedious and time-consuming. The inventive solution, using a raster object overlay means, and a subsequent raster-to-vector conversion based on a 32-bit segmentation map that codes each region with object ID number, totally eliminates the lack-of-topological-integrity problem. For this instant, the novel GIS system uses the following commands to generate a base map in which object-to-object spatial relationship is limited only to "disjoint" or "meet" conditions of FIG. 4 as follows:

file display object_p = (6)
pixtone(integer_1) object_q = pixtone(integer_2);

Here, the variable integer ranges from 0 to 255. The "file display" command outputs a digital image file to the hard disk. Since object_q is displayed on top of object_p, there are no overlapping pixels between these objects. The strategy is to display the most important object last.

The "file display" command in Equation (6) outputs extracted objects in an image format. The extracted objects then can be recycled back to the existing object extraction system by two means. Option #1 uses this output image as an additional information layer in the input sources. For this option, simply restart the information extraction process by adding a new input layer. For example, if the original rule set has this command indicating two input sources, bands=2, simply edit the rule base by using this new command:

bands=3

Option #2 achieves the same objective by editing the rule base file without adding a new, external input layer. For this model, create a so-called "confidence layer" and its associated protocols in the expanded rule base. For example, a typical expanded rule set has this format:

bands=3; (the original is bands=2)

delayed by target_object_A band 3=confidence target_object_A.

This new band can then be segmented, and the object in it can be used as an associated feature to extract another object. In general, option #1 is easier for a beginner. A seasoned rule base designer usually uses option #2 to avoid an intermediate step of generating and adding a new input image outside the rule base.

Input the Object-Based Image to the Segmenter to Generate a 32-Bit Object-Id Coded Segmentation Map and Corresponding Attribute Table and Boundary File To convert the object-based image into a 32-bit region-ID code-based segmentation map, the following commands are used:

Bands = 1; (7)

Initial Cutoff 1 = 0;

Segmentation Type 1 = local;

Seek object_bright;

Region Object_bright{#0 tone 1 = (200 255)];

BW 1 display Object_bright = magenta;

0 segmentation file 1 = boundary;

0 segmentation file 1 = features;

0 segmentation file 1 = dbase; /∗ above commands generate their output files ∗/

To receive these three output files, the three file names are entered at the file output window. For example, these file names can be:

object_pq_boundary (8)

object_pg_feat object_pq_dbase

In the hard disk, these three files have these extensions:

object_pq_boundary.ton (9)

object_pg_feat.ton object_pq_dbase.TON /∗ this is the 32-bit segmentation map ∗/

In xyz_dbase.TON, each region is coded by one unique integer. If the pixels belong to the original region #1, they all have a graytone value of 1. It follows that the graytone value of the pixels in region #2 is 2. Since this is a 32-bit image, the graytone value of a pixel can exceed the number of 256, the upper limit of a conventional 8-bit image.

Convert a 32-Bit Segmentation Image to a Corresponding Boundary and Chain Representation in the Context of an Amorphous Region Topology Paradigm Once an object is represented in an image domain, it occupies a space filled by a set of pixels. This number of pixels ranges from 1 to n, the upper limit of n being dependent on the size of the image. In this image domain, each object is represented by a region. If the region contains one pixel, it is called a one-pixel region; if it contains n pixels, it is called an n-pixel region. Since a region can be of any shape, the topology structure of objects is a mosaic of amorphous regions in which the topological relationships between a pair of objects is either "disjoint" or "meet". The classical geometry-based spatial topology based on a point, line and polygon structure is now totally discarded.

The following is a set of instructions for generating boundary, chain and related topological structure files for output and visualization.

To generate the needed vector files from xxx_dbase.TON, the following steps are performed:

1) To generate a .bnd (boundary) file, type in (or use IMaG GUI in Raster GIS Component):
vectoriz -mode=boundary xxxx_dbase.TON xxxx_dbase.bnd 2) To generate a .chn (chain or arc) file, type in (or use IMaG GUI in Raster GIS Component):
vectoriz -mode=chain xxxx_dbase.TON xxxx_dbase.chn 3) To generate a .cbd (combination of chain and boundary files above), type in:
chnbnd xxxx_dbase.bnd xxxx_dbase.chn xxxx_dbase.cbd The above files are text files, each showing the (x,y) coordinates of the pixels that belong to a region and/or a chain (or arc), and so on.

4) To generate images corresponding to .bnd and/or .chn, type in:
chndraw xxxx_dbase.cbd xxxx_dbase_bndfile.pgm xxxx_dbase_chnfile.pgm Files with the extension pgm are image files in Unix format.

In xxxx_dbase_chnfile.pgm, a chain is coded by a digital number. Therefore, when displayed in XV, different colors represent for different chains. Multiple chains may share one color.

(5) To view where a particular chain is located, we perform two tasks:
 a) type in:
  cbdmtrx xxxx_dbase.cbd xxxx_dbase.cbm
 b) type in:
  chnview xxxx_dbase_chnfile.pgm xxxx_dbase.cbm (10)

Visualization of an Amorphous Region Based Spatial Topology

The above-noted object extraction and vectorization processors are part of the functionality of the IMaG system developed by this applicant. As discussed earlier, IMaG extracts objects using spatial processing functions that do not consider spatial topological integrity a problem. On the other hand, after the objects are extracted and ready for vectorization, IMaG generates a base map from which topological integrity constraints are fully observed. Since the base map is a result of object extraction or segmentation from image data, IMaG has a topological structure that is drastically different from the conventional model based on the classical geometry. In the new paradigm:

Condition 1: Two or more objects do not share a boundary contour except for the background set.
 Then: An isolated region has only a boundary contour with a node.
Condition 2: Two or more objects share a certain section of a boundary contour.
 Then: The shared boundary contour subset is called a chain.
 Then: Each chain has a beginning point/coordinate and an ending point.
 Then: A chain has two neighbors: a right chain and a left chain.
 Then: A region or object has numerous identifiable chains.
 Then: The sum of the chains is the boundary of the object.
Condition 3: Both boundary and chains are generated from an amorphous region.
 Then: Each of the classical geometry-based shape primitives—point, line and polygon—is only a conceptual generalization of an amorphous region.
 Then: The terminologies used in the conventional topological paradigm may not have corresponding concepts in this new topological paradigm. (11)

Empirical examples can be used to illustrate and demonstrate the structural components of this inventive paradigm for maintaining topological integrity in a segmented scene.

Figure 5:
FIG. 5 is a photographic depiction of an FLIR input scene.
Figure 6:
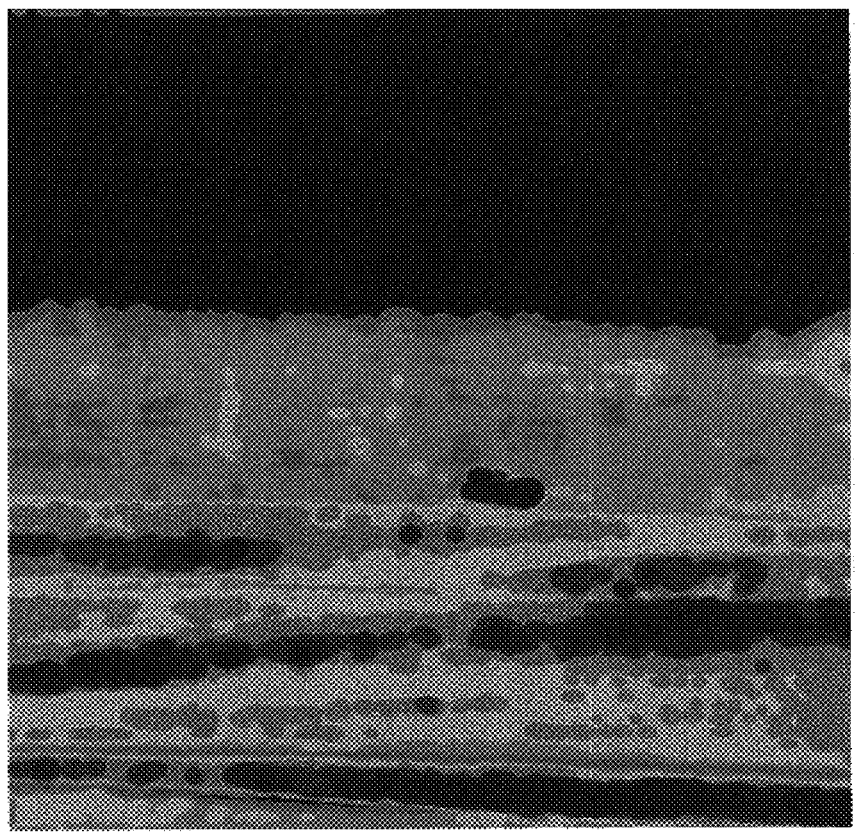
FIG. 6 is a photographic depiction of a ground vehicle and ground clutter in one field.
Figure 7:
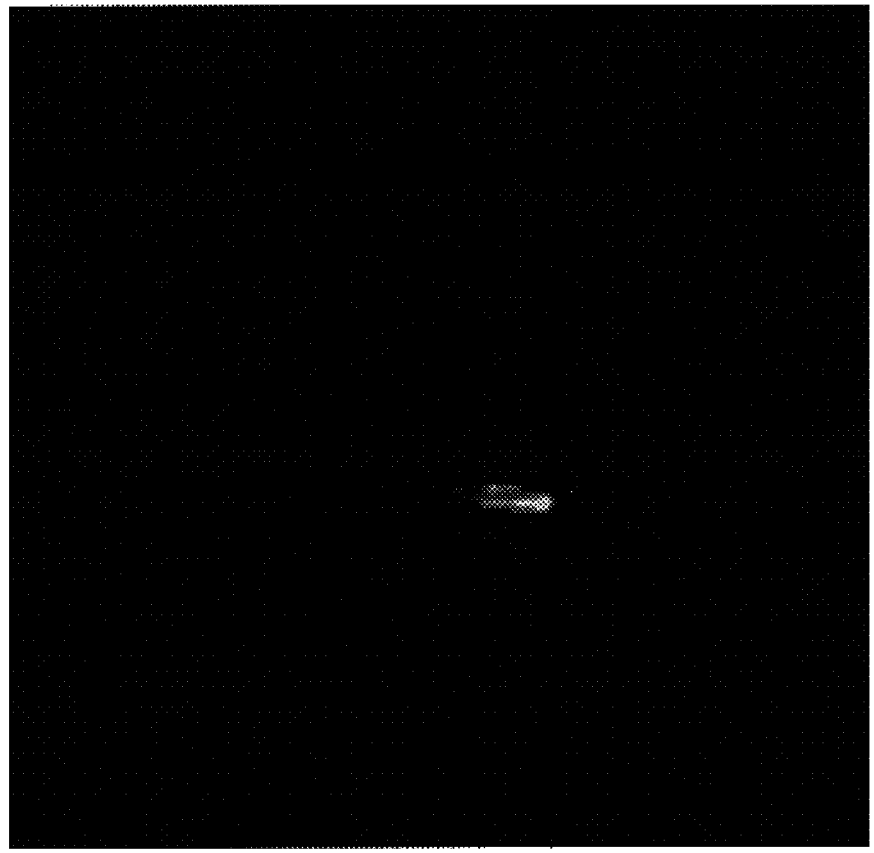
FIG. 7 is a photographic depiction of the ground vehicle and ground clutter shown in FIG. 6, with the ground vehicle distinctly highlighted.

The input image is a ground vehicle in a forward-looking infrared (FLIR) scene. As shown in FIG. 5, the ground vehicle is located approximately at the middle of the scene. It is below a tree zone and a sky zone, but above a ground-clutter zone. To demonstrate the concept of a spatial non-integrity or conflicting condition, three segmentation scenes are generated: FIG. 5 is a ground vehicle alone (plus its background); FIG. 6 is the ground vehicle and ground clutter combined; FIG. 7 is the ground vehicle embedded in the ground clutter but with a different graytone value; and FIG. 8 is the ground vehicle alone.

The spatial relationship between the ground vehicle and the ground clutter is obvious: the ground vehicle touches the ground clutter. When this scene is segmented, there is no topological integrity problem, because the objects share only boundary pixels, not interior regions or pixels.

Figure 8:
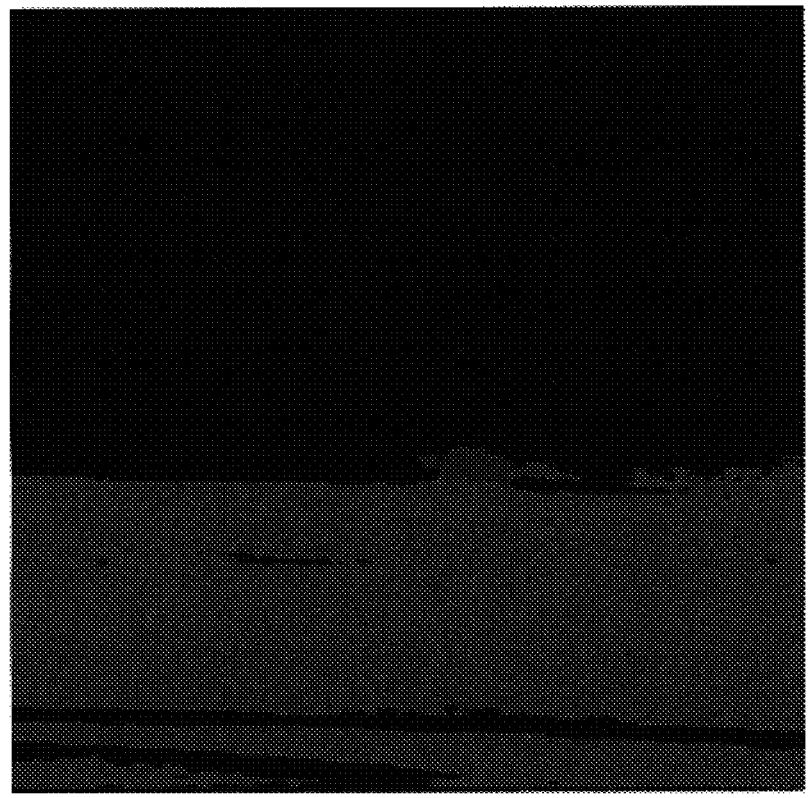
FIG. 8 is a photographic depiction of the ground vehicle of FIGS. 6 and 7 by itself.

There is a topological problem if digitization is done by combining FIG. 6 and FIG. 8 information, because some of the ground clutter territory is occupied by the ground vehicle.

Figure 9:
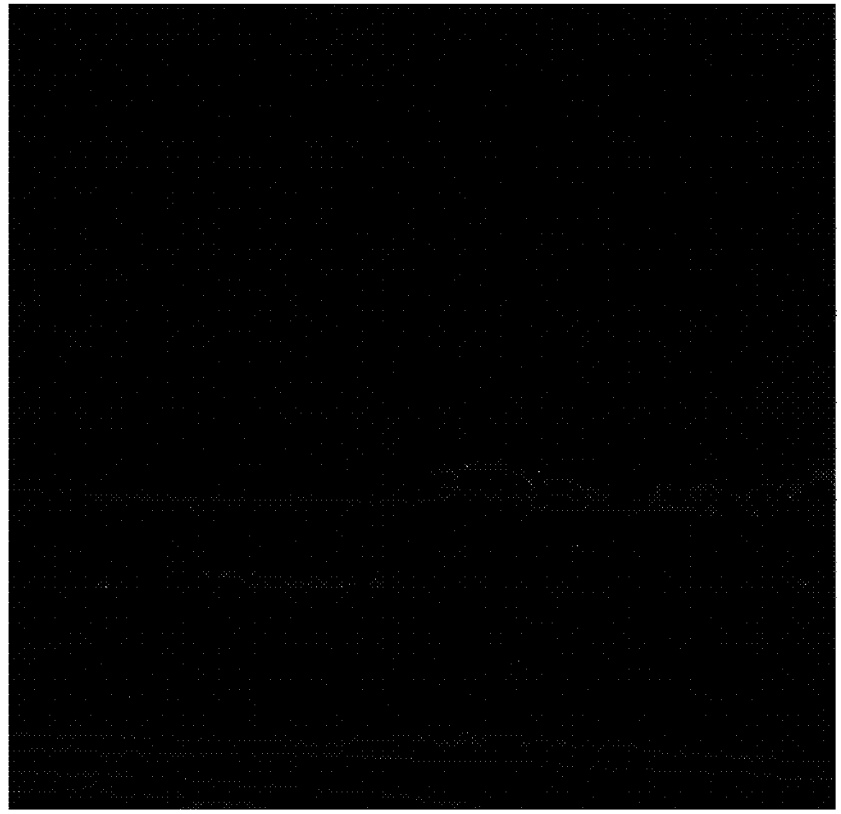
FIG. 9 is a photographic depiction of the image shown in FIG. 7, but having chains provided in accordance with the present invention.

Next, the chains in FIG. 9 are displayed, based on the segmentation scene of FIG. 7.

Note that the ground vehicle has a few colored boundary segments; they are called chains. Note also that each of a few objects below the ground vehicle has only one chain with only one color. In this case, the chain is equivalent to its boundary. Actually, the object is bounded by its background; therefore, in reality, the boundary is also a chain.

Figure 10:
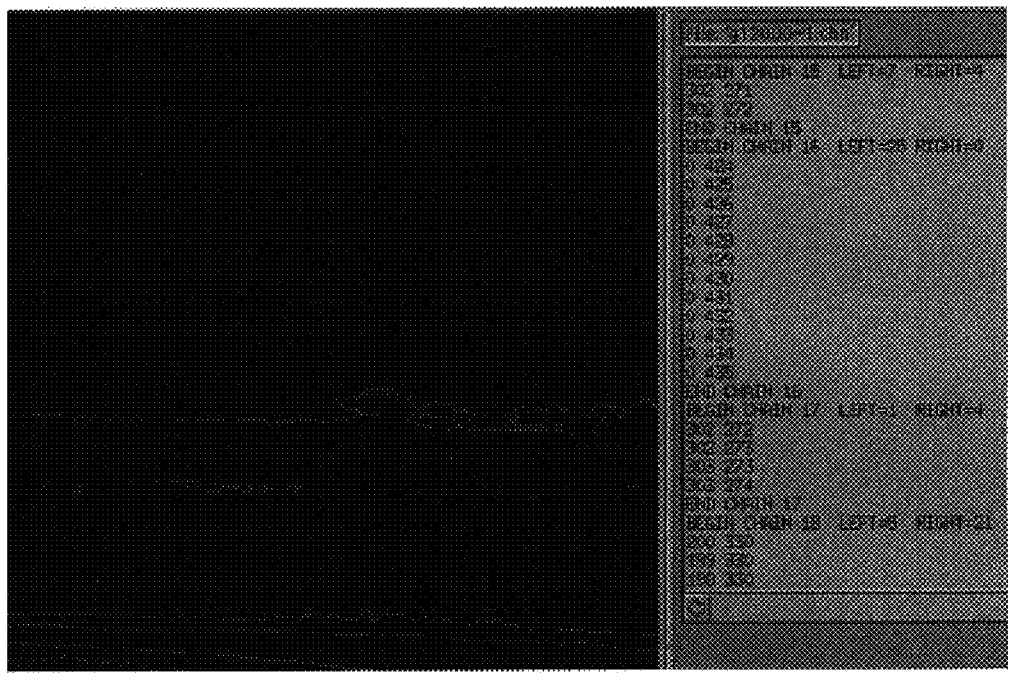
FIG. 10 is a photographic and tabular depiction of the image shown in FIG. 9 and corresponding chains.
Figure 13:
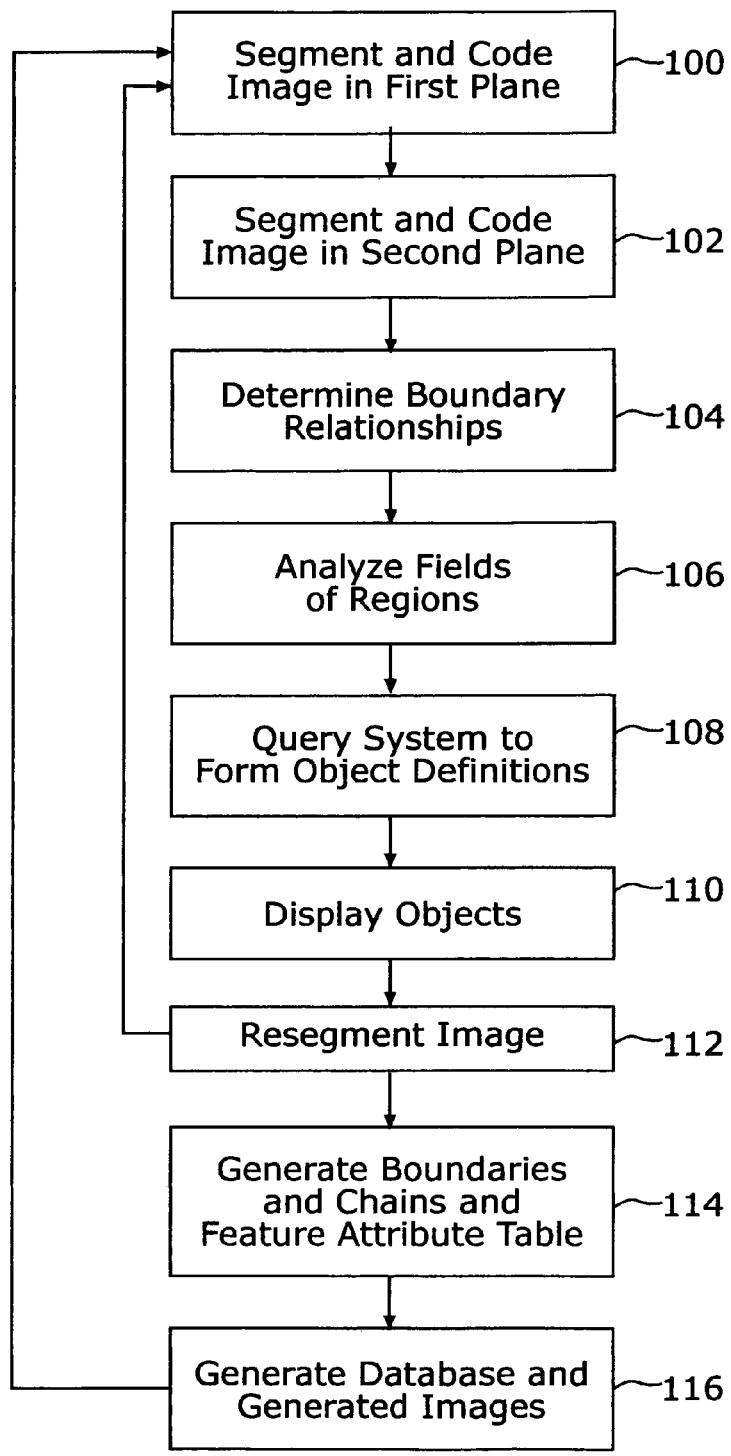
FIG. 13 is a flow chart of system operations in accordance with the present invention.

The numerical values of chains are shown in FIG. 10.

In this graphic display, the original chains in FIG. 9 are shown, at the same time, the numerical ID of one particular chain #23, which identifies one of the chains of the ground vehicle. Notice that this chain has a right chain #4 and a left chain #5 as its neighbors. One of the pixels on this chain is row 261 and column 282, as shown above.

When a scene is segmented, the user has an opportunity to output a feature attribute table to summarize the characteristics of the scene by describing each segmented region with twenty descriptors, such as region ID, its Size, Tone, Row Center, Column Center, Row Min, Row Max, Column Min, Column Max, a number of shape variables, orientation, texture and Max Tone and Min Tone. The table corresponding to FIG. 7 is shown in FIG. 11.

The row in FIG. 11 corresponds to a region in FIG. 10 or FIG. 7. While FIG. 10 data shows the location and ID of each chain, each row in FIG. 11 provides the interior information of the region. Therefore, the information in FIG. 11 complements that of FIG. 10. The combination of chain information and the interior/region information constitutes a vector database.

As mentioned hereinabove, the vector database is derived from a segmentation analysis and vectorization of the scene of FIG. 7. Since FIG. 7 is by nature a raster image, an integration between FIG. 7 with its corresponding vector representations of FIGS. 10 and 11 constitutes a hybrid raster/vector database.

In FIG. 11 note that column 2 of a feature attribute table is reserved for the mean graytone value of the corresponding segmented region. However, this tone value can be controlled by IMaG using the mechanism of:

$$\text{File Display Object\_k=pixtone(xyz);} \tag{12}$$

Thus, if the output scene corresponding to "file display"-generated scene is used as the input image to a segmentation analysis, the tone value in the corresponding feature attribute table is immediately known. This feature attribute table generation algorithm was presented in Equation (7) and, for convenience, is repeated below:

$$\begin{aligned}&\text{Bands} = 1; \\ &\text{Initial Cutoff } 1 = 0; \\ &\text{Segmentation Type } 1 = \text{local}; \\ &\text{Seek object\_bright}; \\ &\text{Region Object\_bright}\{\#0 \text{ tone } 1 = (200\ 255)]; \\ &\text{BW 1 display Object\_bright} = \text{magenta};\end{aligned} \tag{7}$$

```
-continued
#0 segmentation file 1 = boundary;

0 segmentation file 1 = features; /* this is for feature attribute table */

0 segmentation file 1 = dbase; /* above commands generate their output files *
```

Essentially, the coupling of Equation (12) with Equation (7) generates graytone values in the feature attribute table that can be used as a reference for object identification.

Change detection and accuracy assessment are two topics tied very closely with automatic feature extraction and automatic target recognition. Essentially, it is important to know how accurate is the extracted contour when it is compared against a standard, which can be a model, or ground truth-based feature, or a feature based on a certain algorithm. In any case, the discrepancy between them can be interpreted as a change from time period 1 to time period 2, or an error between the standard and the observed.

Following a conventional method of object boundary digitization (i.e., using a polygon to represent an amorphous region), there is an inherent error between an observed shape and a standard. This problem is solved herein by:

1) using pixel-based boundary contour to compare or match two regions;
2) determining the distance between the closest pair of points, one on the contour of the observed object, and the other on the contour of the standard shape;
3) determining the average of the distance values (Mean $D_{ij}$) obtained from step (2); and
4) using the mean (average) minimum distance to map the minimum distance data to reveal the pixel whose minimum distance is significantly different from the mean minimum distance.

Since the result of step (3) reveals the discrepancy created by a particular sector of the boundary contour of the observed object, both change detection and accuracy assessment can be made at a micro level, which cannot be realized without a topological integrity paradigm based on the amorphous region concept described above.

Figure 12:
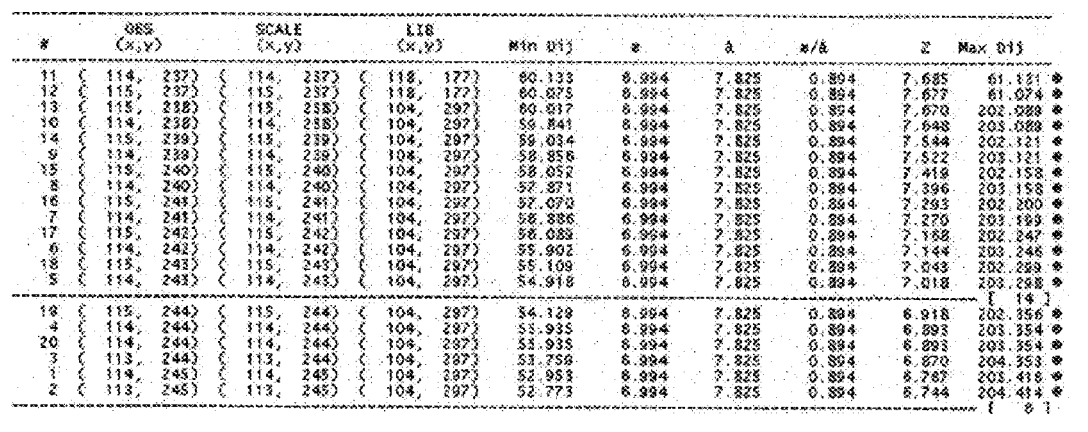

FIG. 12 shows a boundary matching pattern using the ground vehicle of FIG. 5 as the observed object and a wire frame model of a corresponding vehicle as the standard.

The bottom of FIG. 12 gives the minimum distance data (Min $D_{ij}$) and a measure of how many standard deviations away from the mean (Min $D_{ij}$). The boundary contour pixels colored in red are high standard deviation ones (i.e., high mismatch or high-error pixels).

In Equation (7) there is shown a complete rule base for extracting a bright object and a corresponding feature attribute table (file). In other words, the feature attribute table contains information on location, size, tone, texture, shape, etc. of a particular region. Thus, if the user picks and clicks on a particular region, it is possible to generate a rule base to extract regions of similar feature characteristics once the location of the picked and clicked region is known. For example, if the location of a picked and clicked region is row 10 and column 20, characteristics can be obtained of a region whose row center and column center is closest to (10,20). These characteristics in the attribute table can then be used to generate a rule base to extract this and other objects of similar characteristics. In other words, the system provides a means to automatically generate a rule base for object recognition without having to perform manual scripting.

Referring now also to FIG. 14, there is shown a flow chart of the steps performed in accordance with the present invention. Objects in an image are identified, first by segmenting and coding an image in a first plane in at least one segmentation domain, step 100, to create a first set of uniform fields having interior and exterior information and comprising n pixels. The image is then segmented and coded in a second plane in at least one segmentation domain, step 102, to create a second set of uniform fields having interior and exterior information and comprising m pixels. The relationship of the boundary of the first set of fields and the boundary of the second set of fields is determined, step 104. Uniform fields are analyzed, both horizontally and vertically, step 106, and information relating thereto is communicated for relationships of objects among the planes. The system is then queried, step 108, in order to form object definitions, in order to recognize objects in the image. Objects are then displayed on a common image domain, step 110. The image is then resegmented, step 112, each field being coded by a multi-bit (e.g., 32 bit) representation of an ID code. Boundaries and chains are generated from the image, step 114. A database is generated for an object, step 116, the database including at least one parameter from interior attributes and boundary vectors. Once the aforementioned steps have been performed, the system can combine an image on one, self-contained plane. The objects can be arranged in the image by order of importance.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for identifying objects in an image, the steps comprising:

a) segmenting and coding an image from a set of input images in a first plane in at least one segmentation domain to create a first set of uniform fields, and segmenting and coding said or another image in a second plane in at least one segmentation domain to create a second set of uniform fields;
b) generating feature attribute tables, each corresponding to one of said planes;
c) selecting an intended object; and
d) automatically generating a rule set for object recognition.

2. The method for identifying objects in an image in accordance with claim 1, wherein said selecting step (c) comprises pointing and clicking said object.

3. The method for identifying objects in an image in accordance with claim 1, wherein said selecting step (c) comprises articulating at least one from the group of attributes, characteristics, relationships, and associated features.

4. The method for identifying objects in an image in accordance with claim 1, wherein said selecting step (c) comprises providing object characteristic parameters.

5. The method for identifying objects in an image in accordance with claim 1, wherein said selecting step (c) comprises providing information in graphics form.

6. The method for identifying objects in an image in accordance with claim 1, the steps further comprising displaying objects on a common image domain.

7. The method for identifying objects in an image in accordance with claim 1, wherein each of said sets of uniform fields is coded by a multi-bit representation of an ID code.

8. The method for identifying objects in an image in accordance with claim 1, the steps further comprising generating boundaries and chains from said image.

9. The method for identifying objects in an image in accordance with claim 1, wherein said object definitions are selected from the group of region-based, pixel-based, a combination of pixel- and region-based, and a combination of pixel-, region- and spatial relationship-based definitions.

10. The method for identifying objects in an image in accordance with claim 1, the steps further comprising:

f) generating a database for an object, said database including at least one parameter from the group consisting of interior attributes and boundary vectors.

* * * * *